(12) United States Patent
Liang et al.

(10) Patent No.: US 12,298,794 B2
(45) Date of Patent: May 13, 2025

(54) PROGRAMMABLE OUTPUT LOW-DROPOUT VOLTAGE REGULATOR

(71) Applicant: SKYWORKS SOLUTIONS, INC., Irvine, CA (US)

(72) Inventors: Bang Li Liang, Ottawa (CA); Guillaume Alexandre Blin, Carlisle, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 220 days.

(21) Appl. No.: 17/955,333

(22) Filed: Sep. 28, 2022

(65) Prior Publication Data

US 2023/0100609 A1    Mar. 30, 2023

Related U.S. Application Data

(60) Provisional application No. 63/249,718, filed on Sep. 29, 2021.

(51) Int. Cl.
*G05F 1/571* (2006.01)
*G05F 1/575* (2006.01)

(52) U.S. Cl.
CPC .............. *G05F 1/571* (2013.01); *G05F 1/575* (2013.01)

(58) Field of Classification Search
CPC ...................................... G05F 1/565
See application file for complete search history.

(56) References Cited

U.S. PATENT DOCUMENTS

| | | | | |
|---|---|---|---|---|
| 6,373,231 B1* | 4/2002 | Lacey | ..................... | G05F 1/565 323/268 |
| 7,619,402 B1* | 11/2009 | Kwong | ................... | G05F 1/575 323/369 |
| 2016/0291621 A1* | 10/2016 | Whidden | ................ | G05F 1/577 |
| 2020/0272186 A1* | 8/2020 | Inoue | ...................... | G05F 1/563 |

* cited by examiner

*Primary Examiner* — Peter M Novak
(74) *Attorney, Agent, or Firm* — Chang & Hale LLP

(57) ABSTRACT

A low-dropout (LDO) voltage regulation circuit comprises a first supply voltage, a first transistor, an overshoot control module, and coupling circuitry configured to couple the first supply voltage, the transistor, and the overshoot control module at a first node.

18 Claims, 4 Drawing Sheets

PROGRAMMABLE OUTPUT LOW-DROPOUT VOLTAGE REGULATOR

CROSS-REFERENCE TO RELATED APPLICATION

This application claims priority to U.S. Provisional Application No. 63/249,718 filed Sep. 29, 2021, entitled PROGRAMMABLE OUTPUT LOW-DROPOUT VOLTAGE REGULATOR, the disclosure of which is hereby expressly incorporated by reference herein in its respective entirety.

BACKGROUND

Some embodiments of the present disclosure relate to programmable output low-dropout (LDO) voltage regulators (Vregs) with power supply ramping overshoot control and/or programmable phase margin optimization.

Some equipment front-end modules (eFEMs) may require certain specifications for module controllers to meet the actual demands of various eFEM applications. For example, ultra-low off-state current eFEMs for mm-wave communications and/or other eFEMs may require ultra-low off-state current for module controllers. Some eFEMs may additionally or alternatively require relatively fast wake-up times (i.e., times from an off-state to an on-state) and/or on-die electronic fuse (eFuse) trimming functions for relatively high product yield.

SUMMARY

In accordance with some implementations, the present disclosure relates to a low-dropout (LDO) voltage regulation circuit including: a first supply voltage; a first transistor; an overshoot control module; and coupling circuitry configured to couple the first supply voltage, the first transistor, and the overshoot control module at a first node.

In some aspects, the techniques described herein relate to a LDO voltage regulation circuit, further including a bandgap voltage source.

In some aspects, the techniques described herein relate to a LDO voltage regulation circuit, further including an amplifier including a positive terminal and a negative terminal, wherein the coupling circuitry is further configured to couple the bandgap voltage source to the negative terminal of the amplifier.

In some aspects, the techniques described herein relate to a LDO voltage regulation circuit, further including a voltage regulator output.

In some aspects, the techniques described herein relate to a LDO voltage regulation circuit, wherein the coupling circuitry is further configured to couple the overshoot control module and the voltage regulator output at a second node.

In some aspects, the techniques described herein relate to a LDO voltage regulation circuit, wherein the overshoot control module includes a first resistor and a second transistor, and wherein the coupling circuitry is further configured to couple the second transistor and the voltage regulator output at a second node.

In some aspects, the techniques described herein relate to a LDO voltage regulation circuit, wherein first transistor includes a first gate, a first source, and a first drain, and wherein the coupling circuitry is further configured to couple the first supply voltage, the first drain, and the overshoot control module at the first node.

In some aspects, the techniques described herein relate to a LDO voltage regulation circuit, wherein the overshoot control module includes a first resistor, and wherein the coupling circuitry is further configured to couple the first supply voltage, the first drain, and the first resistor at the first node.

In some aspects, the techniques described herein relate to a LDO voltage regulation circuit, further including an amplifier, wherein the first transistor includes a first gate, a first source, and a first drain, and wherein the coupling circuitry is further configured to couple an output of the amplifier to the first gate.

In some aspects, the techniques described herein relate to a LDO voltage regulation circuit, further including a select switch module, wherein the coupling circuitry is further configured to couple the first transistor, the overshoot control module, and the select switch module at a second node.

In some aspects, the techniques described herein relate to a method of regulating output voltage including: receiving a first input voltage from a first voltage source; and directing the first input voltage to an overshoot control module configured to increase channel resistance in response to decreased supply voltage and configured to decrease channel resistance in response to increased supply voltage.

In some aspects, the techniques described herein relate to a method, wherein the overshoot control module includes a first resistor and a first transistor.

In some aspects, the techniques described herein relate to a method, wherein the first resistor is coupled between a gate of the first transistor and the first voltage source.

In some aspects, the techniques described herein relate to a method, further including directing the first input voltage to a first transistor coupled between the first voltage source and the overshoot control module.

In some aspects, the techniques described herein relate to a circuit including: a first supply voltage; an amplifier including a positive terminal and a negative terminal; a first transistor; an overshoot control module; and coupling circuitry configured to couple the first supply voltage, the first transistor, and the overshoot control module at a first node.

In some aspects, the techniques described herein relate to a circuit, further including a bandgap voltage source.

In some aspects, the techniques described herein relate to a circuit, wherein the coupling circuitry is further configured to couple the bandgap voltage source to the negative terminal of the amplifier.

In some aspects, the techniques described herein relate to a circuit, further including a voltage regulator output.

In some aspects, the techniques described herein relate to a circuit, wherein the coupling circuitry is further configured to couple the overshoot control module and the voltage regulator output at a second node.

In some aspects, the techniques described herein relate to a circuit, wherein the overshoot control module includes a first resistor and a second transistor, and wherein the coupling circuitry is further configured to couple the second transistor and the voltage regulator output at a second node.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DESCRIPTION

The headings provided herein, if any, are for convenience only and do not necessarily affect the scope or meaning of the claimed invention.

Some embodiments of the present disclosure relate to programmable output low-dropout (LDO) voltage regulators (Vregs) with power supply ramping overshoot control and/or programmable phase margin optimization.

Some equipment front-end modules (eFEMs) may require certain specifications for module controllers to meet the actual demands of various eFEM applications. For example, ultra-low off-state current eFEMs for mm-wave communications and/or other eFEMs may require ultra-low off-state current for module controllers. Some eFEMs may additionally or alternatively require relatively fast wake-up times (i.e., times from an off-state to an on-state) and/or on-die electronic fuse (eFuse) trimming functions for relatively high product yield.

Some embodiments described herein may advantageously provide low-power LDO regulators with fast-response bandgap reference and/or LDOs for digital cores and/or analog blocks to support complex mixed-signal systems. In some embodiments, an LDO for a digital core may be configured to operate with a relatively low supply voltage for low off-stage leakage current. For analog blocks, the LDO may be configured to operate using a relatively high supply voltage for specific functions (e.g., eFuse) and/or better performance (e.g., at a power amplifier and/or radio frequency (RF) switch control signal driver and/or level shifter).

In some embodiments, multiple LDOs may be configured with different output regulated voltages to supply digital core, analog blocks, digital-to-analog, analog-to-RF, and/or shifter/buffer/driver blocks.

A low-power and/or fast-response (e.g., start-up response) programmable output LDO may be configured to provide power supply ramping overshoot control and/or programmable phase margin optimization. The LDO may be configured to support an ultra-low leakage current digital core under low regulation voltages, on-die eFuse under high regulation voltages during eFuse operation, and/or moderate regulation voltages for nominal active mode operation. In some embodiments, a single low-power programmable output LDO may be used rather than multiple fixed-output LDOs to achieve lower current consumption and/or smaller die area simultaneously. In some embodiments, relatively short start-up time and/or an optimized phase margin for a programmed output regulation voltage may be achieved through use of power supply ramping overshoot control and/or programmable phase margin optimization.

Figure 1:
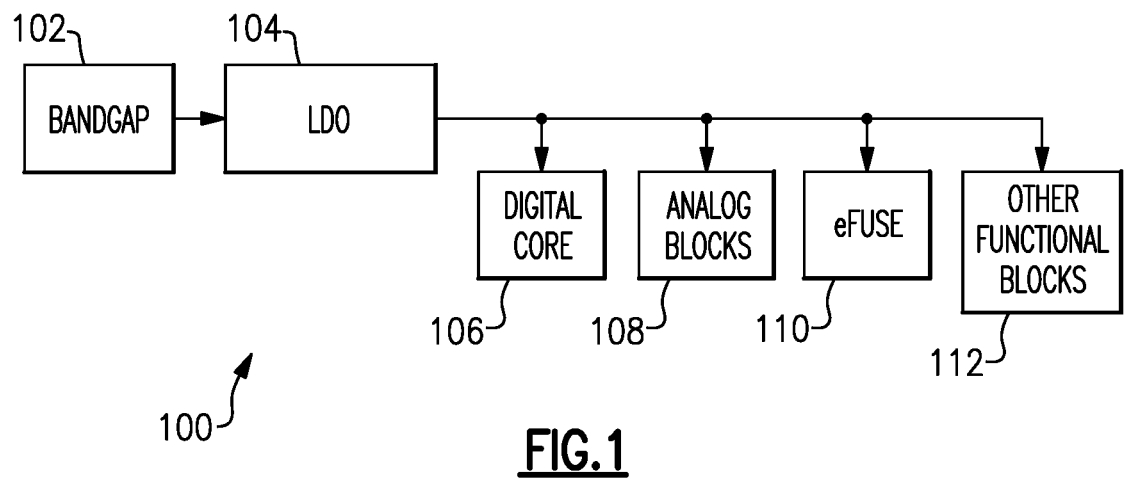
FIG. 1 provides block diagram of a power management architecture.
Figure 2:
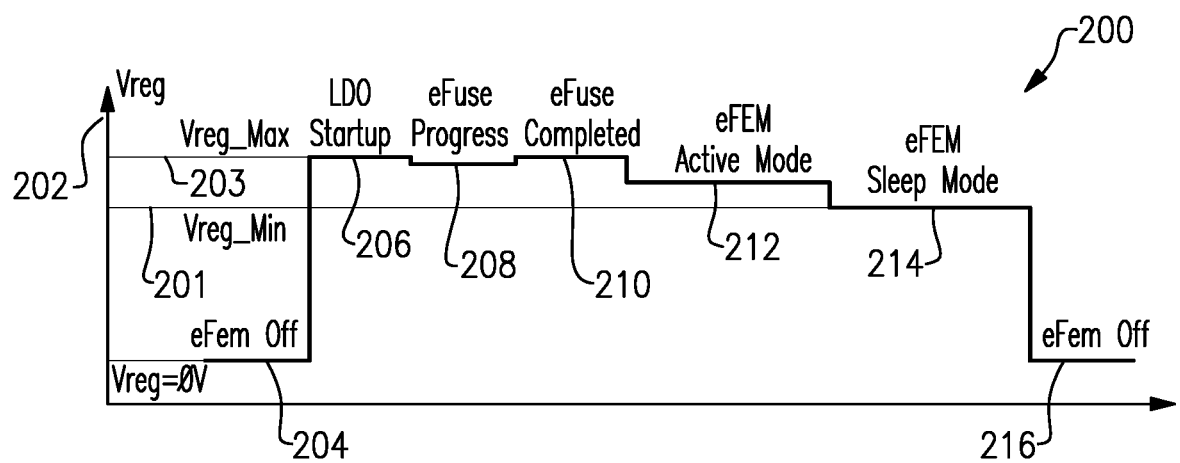
FIG. 2 provides a graph of regulation voltage (Vreg) values at various stages of the power management architecture of FIG. 1.

FIG. 1 provides block diagram of a power management architecture 100. FIG. 2 provides a graph 200 of regulation voltage (Vreg) 202 values at various stages of the power management architecture 100 of FIG. 1. The architecture 100 may be configured to provide LDO output voltages in multiple modes, including LDO eFEM off 204, startup 206, eFuse progress 208, eFuse completed 210, eFEM active mode 212, and/or eFEM sleep mode 214. As shown in FIG. 2, the LDO may be configured to supply a maximum Vreg value 203 during eFUSE operation and/or supply a minimum Vreg value 201 during sleep mode 214 (e.g., when the architecture 100 may experience only digital core leakage current and/or other blocks may be powered off). Moreover, the LDO may be configured to supply a medium Vreg value for analog and/or digital blocks operating in active modes.

A semiconductor die may utilize an electronic fuse (eFuse) to enable and/or facilitate programming of the semiconductor die during one or more modes of operation of the semiconductor die. An eFuse may be situated within the semiconductor die to allow the die to be trimmable. In some embodiments, software may be used to trim the die automatically such that the die meets a desired specification. For example, all semiconductor dies within a system may be trimmed such that all of the dies meet a desired and/or common specification. The eFuse may be used in combination with testing of the die to ensure that the die meets certain output voltage levels. A programmable supply voltage may support reliability and/or performance of the semiconductor dies. In some embodiments, a semiconductor die comprising an eFuse may be configured to operate at different settings for different modes. For example, the semiconductor die may be configured to operate at different settings during testing modes and/or normal operating modes.

A testing process for a semiconductor die may involve changing resistance within the semiconductor die using switches associated with the semiconductor die. As resistance values within the semiconductor die are adjusted, an optimal state of the semiconductor die may be determined. An eFuse associated with the semiconductor die may be set to maintain the optimal state after it is determined.

Figure 3:
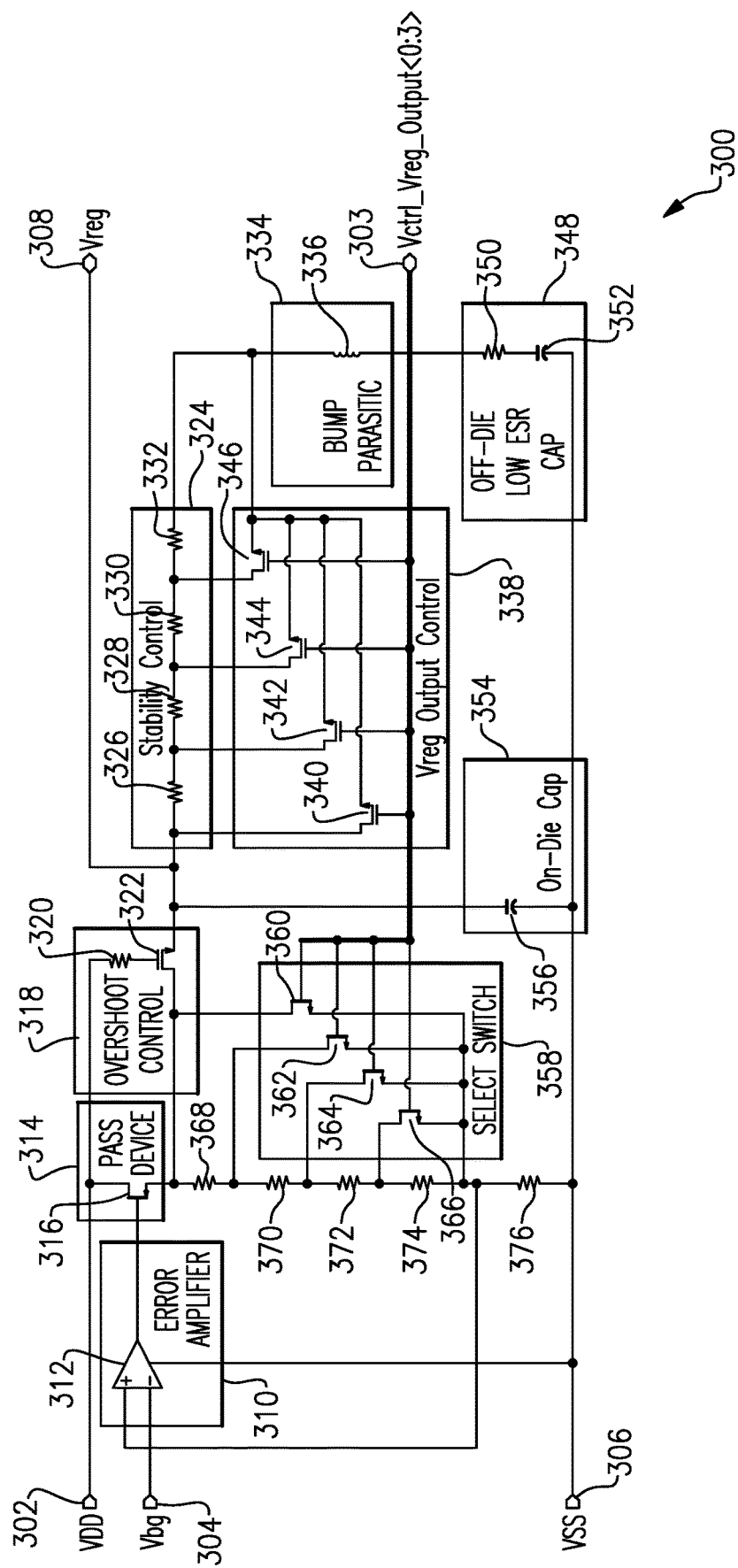
FIG. 3 illustrates a programmable output LDO configured to provide power supply ramping overshoot control and/or programmable phase margin optimization in accordance with one or more embodiments.

FIG. 3 illustrates a programmable output LDO 300 configured to provide power supply ramping overshoot control and/or programmable phase margin optimization in accordance with one or more embodiments. The LDO 300 may be configured to receive multiple supply voltages. An eFuse of the LDO 300 may require a high supply voltage to generate a high current. To maintain performance, a lower supply voltage may be used for basic function of the LDO 300. Power consumption of the LDO 300 may be defined as the supply voltage multiplied by the frequency squared (e.g., $P=V*F^2$). By lowering the voltage of the LDO 300 to a minimal value, the power usage of the LDO 300 may be optimized.

The LDO 300 may comprise various coupling circuitry configured to interconnect and/or couple components of the LDO 300. A first supply voltage (VDD) 302 and/or power supply may be configured to power various components of the LDO 300. The LDO 300 may further comprise an output voltage (Vctrl_Vreg_Output) node 303. A voltage at the output voltage node 303 may depend on and/or may be modified by a resistor network comprising one or more series-connected resistors, which can include a first resistor 368, a second resistor 370, a third resistor 372, a fourth resistor 374, and/or a fifth resistor 376. The resistors of the resistor network may be selectively coupled to the output voltage node 303 via a select switch 358 comprising one or more switches and/or transistors, including a first transistor 360, a second transistor 362, a third transistor 364, and/or a fourth transistor 366. The first transistor 360, second transistor 362, third transistor 364, and/or fourth transistor 366 may comprise sources each coupled to a node situated between the fourth resistor 374 and the fifth resistor 376. The first transistor 360 may comprise a drain coupled to an overshoot control module 218 and/or to a drain of a fifth transistor 322 of the overshoot control module 218. The second transistor 362 may comprise a drain coupled to a node situated between the first resistor 368 and the second resistor 370. The third transistor 364 may comprise a drain coupled to a node situated between the second resistor 370 and the third resistor 372. The fourth transistor 366 may comprise a drain coupled to a node situated between the third resistor 372 and the fourth resistor 374. Each of the first transistor 360, a second transistor 362, a third transistor 364, and/or a fourth transistor 366 may comprise gates directly coupled to the output voltage node 303.

A voltage at the output voltage node 303 may be determined based on the resistor network and/or a bandgap voltage 304 (Vbg). For example, the output voltage at the output voltage node 303 may equal a product of a ratio of the first resistor 368 and fifth resistor 376 and the bandgap voltage 304 (e.g., Vout=R1/R5*Vbg).

The bandgap voltage 304 may be coupled to an error amplifier 310 and/or to a negative terminal of an amplifier 312 of the error amplifier 310. A positive terminal of the amplifier 312 may be coupled to the node situated between the fourth resistor 374 and the fifth resistor 376. A first output of the amplifier 312 may be coupled to a second supply voltage 306 (VSS) and/or to ground. A second output of the amplifier 312 may be coupled to a gate of a sixth transistor 316 of a pass device module 314. A source of the sixth transistor 316 may be coupled to a node situated between the first resistor 368 and the drain of the fifth transistor 322.

Voltage from VDD 302, Vbg 304, and/or VSS 306 may be directed to an overshoot control module 318 and/or the pass device module 314. The overshoot control module 318 may comprise the fifth transistor 322 and/or a sixth resistor 320 coupled to a gate of the fifth transistor 322. The sixth resistor 320 may further be coupled to a drain of the sixth transistor 316 and/or to the first supply voltage 302. The overshoot control module 318 may advantageously be configured to provide stability control and/or smooth output voltage values (e.g., voltages at the output voltage node 303 and/or regulation voltage node 308) of the LDO 300. For example, the overshoot control module 318 may be configured to allow for gradual adjustments to the output voltage from, for example, 0V to a desired voltage. As the first supply voltage 302 increases, the overshoot control module 318 may allow the output voltage to increase without experiencing sharp peaks.

The LDO 300 may further comprise a stability control module 324 and a regulation voltage output control module 338. The stability control module 324 may comprise one or more series-connected resistors, which can include a seventh resistor 326, an eighth resistor 328, a ninth resistor 330, and/or a tenth resistor 332. The regulation voltage output control module 338 may comprise one or more transistors, which can include a seventh transistor 340, an eighth transistor 342, a ninth transistor 344, and/or a tenth transistor 346. The seventh transistor 340 may comprise a drain coupled to a first node situated between the seventh resistor 326 and the source of the fifth transistor 322. A regulation voltage (Vreg) node 308 may be coupled to a second node situated between the first node and the source of the fifth transistor 322. A third node situated between the second node and the source of the fifth transistor 322 may be coupled to an anode of a first capacitor 356 of an on-die capacitor module 354. A cathode of the first capacitor 356 may be coupled to the second supply voltage 306 and/or ground.

The seventh transistor 340, eighth transistor 342, ninth transistor 344, and/or tenth transistor 346 may each comprise gates coupled directly to nodes situated between the output voltage node 303 and the gates of the transistors of the select switch module 358. A drain of the eighth transistor 342 may be coupled to a node situated between the seventh resistor 326 and the eighth resistor 328. A drain of the ninth transistor 344 may be coupled to node situated between the eighth resistor 328 and the ninth resistor 330. A drain of the tenth transistor 346 may be coupled to a node situated between the ninth resistor 330 and the tenth resistor 332. The seventh transistor 340, eighth transistor 342, ninth transistor 344, and/or tenth transistor 346 may each comprise sources coupled to a node situated between the tenth resistor 332 and a bump parasitic module 334 and/or an inductor 336 of the bump parasitic module 334.

The LDO 300 may further comprise an off-die low equivalent series resistance (ESR) capacitance module 348 comprising an eleventh resistor 350 and/or a second capacitor 352 (e.g., an off-die capacitor). An anode of the second capacitor 352 may be coupled to the eleventh resistor 350 and/or a cathode of the second capacitor 352 may be coupled to the second supply voltage 306 and/or ground. The eleventh resistor 350 may be coupled directly to the inductor 336.

A phase margin (e.g., over process, voltage, and temperature (PVT) variations) of the LDO 300 may be optimized for all output modes by tuning on-die resistance to realize tunable equivalent series resistance (ESR_eq) (e.g., equal to a sum of the on-die resistance and/or capacitance) of the second capacitor 352. Moreover, the overshoot control module 318 (e.g., including an on-die transistor 322) may be adapted to reduce excessive overshoot during ramping and/or increasing voltage and/or power from the first power supply 302. When power input from the first power supply 302 is low and/or decreased, channel resistance of the fifth transistor 322 between the source of the sixth transistor 316 and the voltage at the regulation voltage node 308 may be high and/or increased (e.g., dropping from the off-die resistance). Moreover, the channel resistance may be low and/or decreased (e.g., down to the on-die resistance) as power from the first power supply 302 increases and/or may be ramping to normal voltage levels. The LDO 300 may be configured to operate well for a wide variety of output modes over wide process, voltage, and temperature (PVT) variations.

Figure 4:
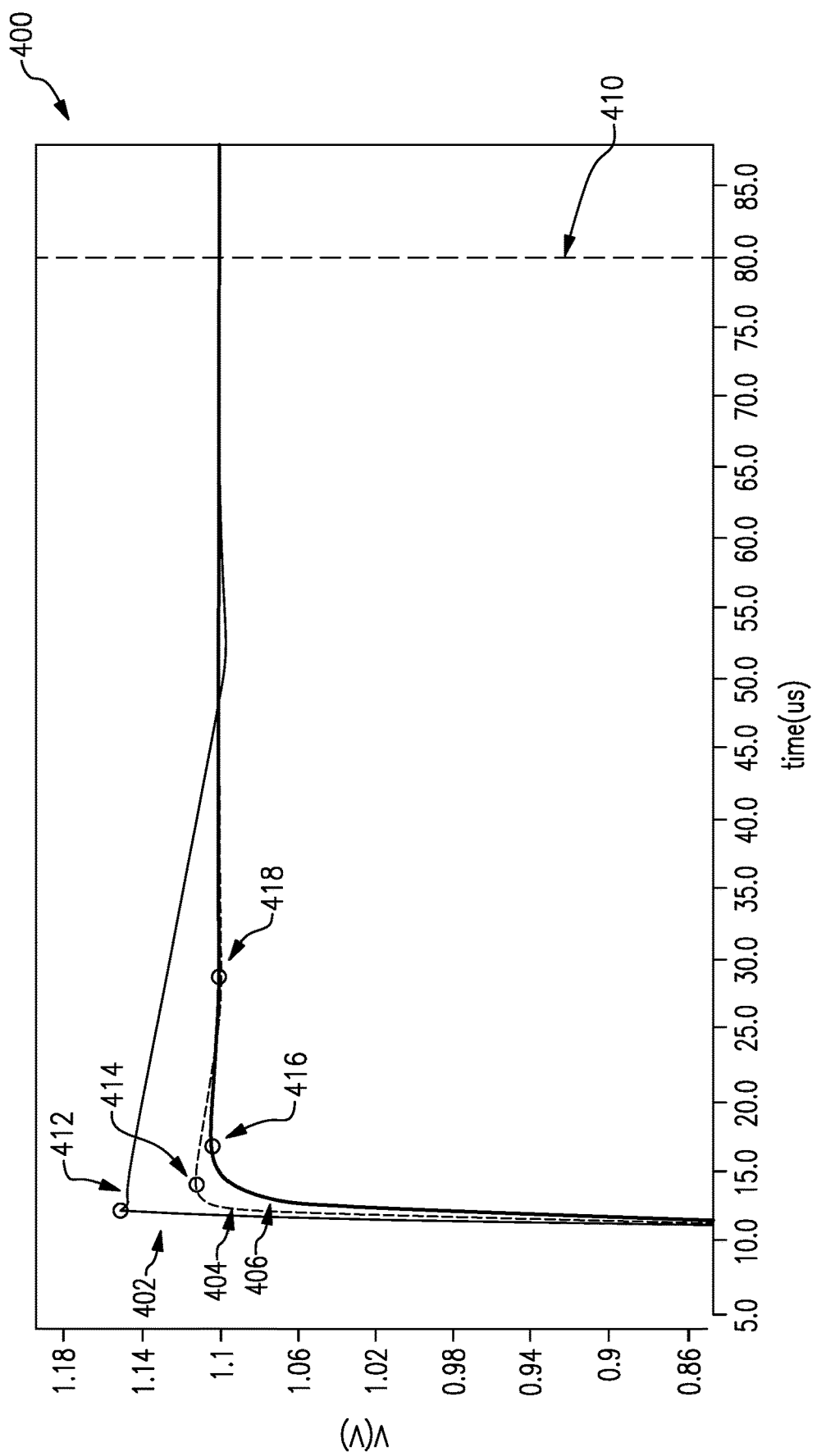
FIG. 4 provides a graph illustrating voltage levels for example LDO circuits in accordance with one or more embodiments.

FIG. 4 provides a graph 400 illustrating voltage levels for example LDO circuits in accordance with one or more embodiments. The graph includes a first plot 402 representing an LDO circuit without overshoot control, a second plot 404 representing an LDO circuit with relatively weak overshoot control, and a third plot 406 representing a third LDO circuit with relatively strong overshoot control (see, e.g., the LDO 300 of FIG. 3). Without overshoot control, the first plot 402 illustrates how an LDO circuit may experience a relatively sharp peak 412 as the regulation voltage of the circuit reduces. A transition from increasing voltage to an approximately constant voltage (e.g., at approximately 1.1V) may be smoothest when overshoot control is the strongest, as illustrated by the relatively smooth peak 416 of the third plot 406 when compared to the first peak 412 and a second peak 414 of the second plot 404. Moreover, the second plot 404 and/or third plot 406 may reach a stable voltage 418 more quickly than the first plot 402. In some cases, the time required for the first plot 402 to reach a stable voltage may be approximately eighty seconds, as indicated at 410.

Figure 5:
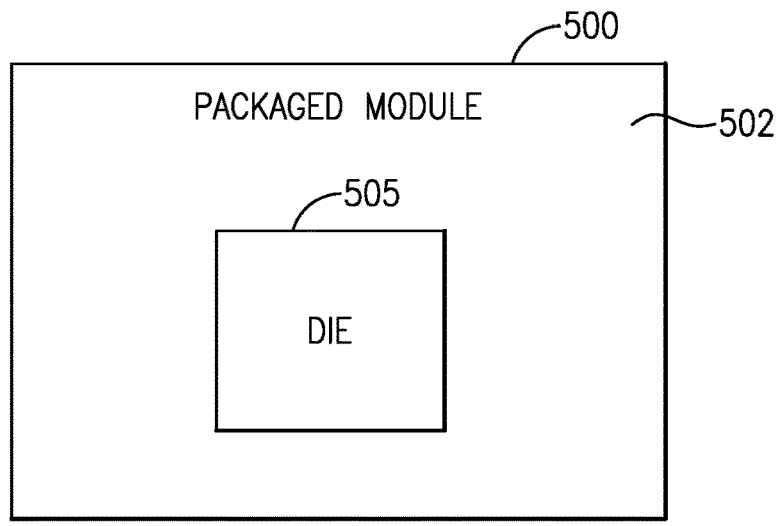
FIG. 5 shows a die implemented in a packaged module. Such a packaged module can include a packaging substrate configured to receive a plurality of components.

FIG. 5 shows a die 505 implemented in a packaged module 500. Such a packaged module can include a packaging substrate 502 configured to receive a plurality of components.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart phone, a hand-held wireless device with or without phone functionality, a wireless tablet, etc.

Figure 6:
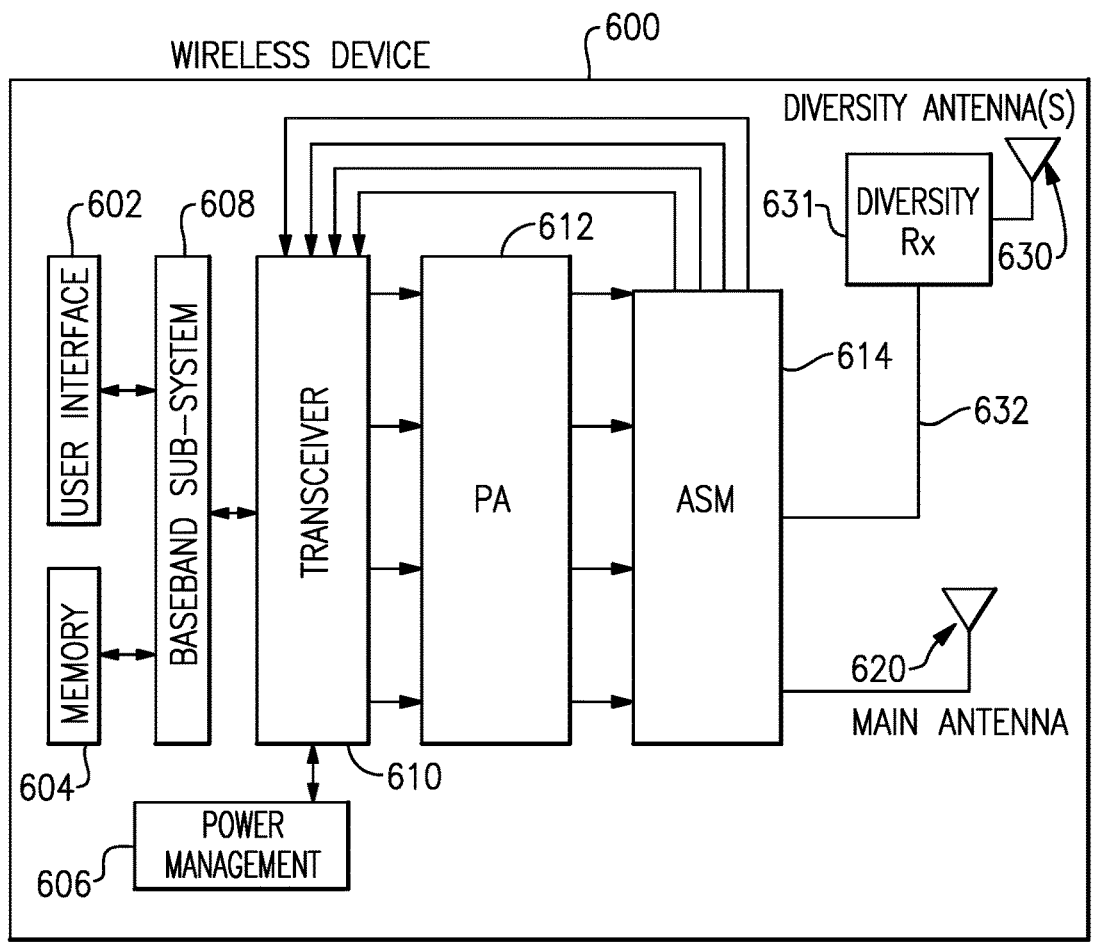
FIG. 6 depicts an example wireless device having one or more advantageous features described herein.

FIG. 6 depicts an example wireless device 600 having one or more advantageous features described herein. In some embodiments, a module that includes one or more power amplifiers can also include one or more clamps having one or more features as described herein.

In the example of FIG. 6, power amplifiers (PAs) are depicted in a PA module 612; however, it will be understood that such power amplifiers can be implemented in one or more functional blocks, one or more devices such as die or modules, etc. Such power amplifiers can receive their respective RF signals from a transceiver 610 that can be configured and operated to generate RF signals to be amplified and transmitted, and to process received signals. The transceiver 610 is shown to interact with a baseband subsystem 608 that is configured to provide conversion between data and/or voice signals suitable for a user and RF signals suitable for the transceiver 610. The transceiver 610 is also shown to be connected to a power management component 606 that is configured to manage power for the operation of the wireless device 600. Such power management can also control operations of the baseband sub-system 608 and other components of the wireless device 600.

The baseband sub-system 608 is shown to be connected to a user interface 602 to facilitate various input and output of voice and/or data provided to and received from the user. The baseband sub-system 608 can also be connected to a memory 604 that is configured to store data and/or instructions to facilitate the operation of the wireless device, and/or to provide storage of information for the user.

In the example of FIG. 6, a diversity receive (DRx) module 631 can be implemented between one or more diversity antennas (e.g., diversity antenna 630) and the front-end module. Such a configuration can allow an RF signal received through the diversity antenna 630 to be processed (in some embodiments, including amplification by an LNA) with little or no loss of and/or little or no addition of noise to the RF signal from the diversity antenna 630. Such processed signal from the DRx module 640 can then be routed to the front-end module through one or more signal paths. In some embodiments, the wireless device 600 may or may not include the foregoing DRx functionality.

In the example of FIG. 6, a plurality of antennas (e.g., 620a, 620b) can be configured to, for example, facilitate transmission of RF signals from the PA module 612. In some embodiments, receive operations can also be achieved through some or all of the antennas 620a, 620b.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general-purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general-purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

What is claimed is:

1. A low-dropout (LDO) voltage regulation circuit comprising:
    a first supply voltage;
    a first transistor;
    an overshoot control module including a first resistor and a second transistor; and
    the first supply voltage, the first transistor, and the overshoot control module being directly coupled at a first node and the first resistor being directly coupled to a gate of the second transistor and to a drain of the first transistor.

2. The LDO voltage regulation circuit of claim 1 further comprising an amplifier, wherein the first transistor includes a first gate, a first source, and a first drain, and wherein an output of the amplifier is directly coupled to the first gate.

3. The LDO voltage regulation circuit of claim 1 further comprising a select switch module including two or more transistors, wherein the first transistor, the second transistor, and the select switch module are directly coupled at a second node.

4. The LDO voltage regulation circuit of claim 1 further comprising an amplifier including a positive terminal and a negative terminal, wherein the negative terminal of the amplifier is directly coupled to a bandgap voltage source.

5. The LDO voltage regulation circuit of claim 4 further comprising a voltage regulator output including two or more transistors.

6. The LDO voltage regulation circuit of claim 5 wherein the second transistor and the voltage regulator output are directly coupled at a second node.

7. The LDO voltage regulation circuit of claim 1 wherein the first transistor includes a first gate, a first source, and a first drain, and wherein the first supply voltage, the first drain, and the overshoot control module are coupled at the first node.

8. The LDO voltage regulation circuit of claim 7 wherein the first supply voltage, the first drain, and the first resistor are coupled at the first node.

9. The LDO voltage regulation circuit of claim 1 wherein a drain of the second transistor is directly coupled to a source of the first transistor.

10. The LDO voltage regulation circuit of claim 9 wherein a source of the second transistor is directly coupled to a regulation voltage source.

11. A method of regulating output voltage comprising:
receiving a first input voltage from a first voltage source; and
directing the first input voltage to an overshoot control module configured to increase channel resistance in response to decreased supply voltage and configured to decrease channel resistance in response to increased supply voltage, the first voltage source being directly coupled to a first transistor and the overshoot control module at a first node, the overshoot control module including a first resistor and a second transistor, and the first resistor being directly coupled to a gate of the second transistor and to a drain of the first transistor.

12. The method of claim 11 further comprising directing the first input voltage to the first transistor.

13. A low-dropout (LDO) voltage regulation circuit comprising:
a first supply voltage;
a first transistor;
an overshoot control module including only a first resistor and a second transistor; and
the first supply voltage, the first transistor, and the overshoot control module being directly coupled at a first node and the first resistor being directly coupled to a gate of the second transistor.

14. The LDO voltage regulation circuit of claim 13 further comprising a bandgap voltage source.

15. The LDO voltage regulation circuit of claim 14 further comprising an amplifier including a positive terminal and a negative terminal, wherein the bandgap voltage source is coupled to the negative terminal of the amplifier.

16. The LDO voltage regulation circuit of claim 15 further comprising a voltage regulator output.

17. The LDO voltage regulation circuit of claim 16 wherein the overshoot control module and the voltage regulator output are coupled at a second node.

18. The LDO voltage regulation circuit of claim 16 wherein the second transistor and the voltage regulator output are coupled at a second node.

* * * * *